(12) United States Patent
Zheng

(10) Patent No.: US 8,250,646 B2
(45) Date of Patent: Aug. 21, 2012

(54) METHOD, SYSTEM, AND DEVICE FOR FILTERING PACKETS

(75) Inventor: Ruobin Zheng, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 408 days.

(21) Appl. No.: 12/693,766

(22) Filed: Jan. 26, 2010

(65) Prior Publication Data

US 2010/0132031 A1 May 27, 2010

Related U.S. Application Data

(63) Continuation of application No. PCT/CN2008/072323, filed on Sep. 10, 2008.

(30) Foreign Application Priority Data

Sep. 27, 2007 (CN) .......................... 2007 1 0151721

(51) Int. Cl.
*H04L 9/32* (2006.01)
(52) U.S. Cl. .......................................... 726/13; 726/11
(58) Field of Classification Search .................. 726/1, 4, 726/11, 13, 23; 713/150, 153; 709/222, 709/223, 227, 230, 238
See application file for complete search history.

(56) References Cited

U.S. PATENT DOCUMENTS

| 5,940,371 | A | 8/1999 | Mitts et al. |
| 2004/0093513 | A1 | 5/2004 | Cantrell et al. |
| 2005/0028013 | A1 | 2/2005 | Cantrell et al. |
| 2005/0044422 | A1 | 2/2005 | Cantrell et al. |
| 2005/0073988 | A1 | 4/2005 | Kroth et al. |
| 2006/0123481 | A1 | 6/2006 | Bhatnagar et al. |
| 2007/0121615 | A1* | 5/2007 | Weill et al. ..................... 370/389 |
| 2007/0156919 | A1* | 7/2007 | Potti et al. ..................... 709/238 |
| 2008/0010677 | A1 | 1/2008 | Kashima et al. |

(Continued)

FOREIGN PATENT DOCUMENTS

CN 101132609 A 0/0220

(Continued)

OTHER PUBLICATIONS

1st Office Action in corresponding Chinese Application No. 200710151721.2 (Jan. 13, 2011).

(Continued)

*Primary Examiner* — Jeffrey Pwu
*Assistant Examiner* — Nega Woldemariam
(74) *Attorney, Agent, or Firm* — Leydig, Voit & Mayer, Ltd.

(57) ABSTRACT

A method, system, and device for filtering packets are disclosed. The method includes: by a deep packet inspection (DPI) proxy server configured at the access-network user side, identifying the service type and/or contents of a received packet, and performing DPI filtering on the packet by using a preset DPI filtering policy according to the identified service type and/or contents. In the technical solution of the present invention, DPI proxy servers are configured at the access-network user side on a distributed basis; each DPI proxy server receives packets only from a user equipment (UE) on a customer premises network (CPN), where the UE corresponds to the DPI proxy server. Compared with the DPI server configured at the edge between the core network and the access network in the prior art, the DPI proxy server provided in embodiments of the present invention processes fewer packets, thus performing real-time DPI on the packets.

5 Claims, 6 Drawing Sheets

U.S. PATENT DOCUMENTS

| | | | |
|---|---|---|---|
| 2008/0188223 A1 | 8/2008 | Vesterinen et al. | |
| 2010/0002650 A1 | 1/2010 | Ahluwalia | |

FOREIGN PATENT DOCUMENTS

| | | |
|---|---|---|
| CN | 1156945 A | 8/1997 |
| CN | 1466312 A | 1/2004 |
| CN | 1578227 A | 2/2005 |
| CN | 1606894 A | 4/2005 |
| CN | 1720459 A | 1/2006 |
| CN | 1937623 A | 3/2007 |
| CN | 1980449 A | 6/2007 |
| CN | 101047967 A | 10/2007 |
| CN | 101047975 A | 10/2007 |
| CN | 101047998 A | 10/2007 |
| CN | 101056222 A | 10/2007 |
| CN | 101365168 A | 2/2009 |
| EP | 2045974 A1 | 4/2008 |
| EP | 2045974 A1 | 4/2009 |
| KR | 2003-0046006 A | 6/2003 |
| WO | 2006063052 A1 | 6/2006 |
| WO | WO 2007/066882 A1 | 6/2007 |

OTHER PUBLICATIONS

Written Opinion of the International Searching Authority in corresponding PCT Application No. PCT/CN2008/072323 (Dec. 4, 2008).

Extended European Search Report in corresponding European Application No. 08800834.7 (Apr. 6, 2011).

International Search Report in corresponding PCT Application No. PCT/CN2008/072323 (Dec. 4, 2008).

Office Action in corresponding Chinese Application No. 200710175412.9 (Aug. 14, 2009).

1st Office Action in corresponding Chinese Application No. 200880108355.5 (Sep. 1, 2011).

Extended European Search Report in corresponding European Application No. 08801016.0 (Feb. 23, 2010).

1st Office Action in corresponding European Application No. 08801016.0 (Oct. 19, 2011).

"R2-073360—DL Data forwarding," 3GPP TSG-RAN2 Meeting #59, Aug. 20-24, 2007, 3rd Generation Partnership Project, Athens, Greece.

Samsung, "Downlink Data Forwarding for Mobility," 13.3.1a 3GPP TSG-RAN3 Meeting #57, Athens Greece, Aug. 20-24, 2007. R3-071367.

Nokia Siemens Networks, "Using GTP-U Header Fields for PDCP SN Forwarding on X2 and S1 Interface," 13.3..1 3GPP TSG-RAN WG3 Meeting #57, Athens, Greence, Aug. 20-24, 2007, R3-071574.

Huawei, "DL User Data Forwarding in X2 HO" 13.3.1a 3GPP TSG RAN WG3 Meeting #57, Athens, Greence, Aug. 20-24, 2007. R3-071465.

NTT DoCoMo, Inc., "PDCP SN Continuation for DL Data Forwarding During Handover," 13.3.1a, 13.3.1b, 3GPP TSG-RAN3#57, Athens, Greece, Aug. 20-24, 2007. R3071352.

Nokia Siemens Networks, "Data Forwarding Mechanism over X2 and S1 Interface," 13.3.1a, 3GPP TSG-RAN WG3 Meeting #57, Athens, Greece, Aug. 20-24, 2007. R3071573.

$3^{rd}$ Generation Partnership Project, "Technical Specification Group Radio Access Network Evolved Universal Terrestrial Access Network (E-UTRA) and Evolved Universal Terrestrial Radio Access Network (E-UTRAN), Overall Description," Stage 2, Release 8, (2 0 0 8).

3rd Generation Partnership Project; Technical Specification Group Radio Access Network; Evolved Universal Terrestrial Radio Access (E-UTRA) and Evolved Universal Terrestrial Radio Access Network (E-UTRAN); Overall Description; Stage 2 (Release 8). 3GPP TS 36.300, V8.1.0, Jun. 2007.

3rd Generation Partnership Project; Technical Specification Group Radio Access Network; Evolved Universal Terrestrial Radio Access Network (E-UTRAN); S1 Application Protocol (S1AP), (Release 8). 3GPP TS 36.413, V1.1.0, Sep. 2007.

* cited by examiner

METHOD, SYSTEM, AND DEVICE FOR FILTERING PACKETS

CROSS-REFERENCE TO RELATED APPLICATIONS

This application is a continuation of International Application No. PCT/CN2008/072323, filed on Sep. 10, 2008, which claims priority to Chinese Patent Application No. 200710151721.2, filed on Sep. 27, 2007, both of which are hereby incorporated by reference in their entireties.

TECHNIQUE FIELD

The present invention relates to the network broadband technology, and in particular, to a method, system, and device for filtering packets.

BACKGROUND

The network broadband technology brings about not only a lot of opportunities but also a lot of problems to the operators. For example, because broadband services cannot be identified, broadband services are difficult to manage; content-based charging cannot be performed; and information security requirements cannot be met. To solve these problems, a deep packet inspection (DPI) technology emerges.

DPI is a new technology relative to the common packet inspection technology. The common packet inspection technology analyzes only the contents below the application layer in an IP packet. That is, the common packet inspection technology performs flow classification on the received packets according to the 5-tuple of packets, and determines the flow type of each packet. The 5-tuple of packets includes source address, destination address, source port, destination port, and protocol type. The DPI technology, however, further identifies packets of the flow types related to DPI. The identification process includes: analyzing packets at the application layer or performing deep flow inspection (DFI) on the packets, and identifying the service type and/or contents of packets corresponding to each flow type; and performing DPI filtering on the packets corresponding to the flow type according to the identified service type and/or contents, for example, discarding the packets according to a DPI policy if viruses are detected in the contents of the received packets. It should be noted that the steps of performing DFI on the packets and identifying the service type and/or contents of the packets belong to the DFI technology. In the embodiments of the present invention, DPI and DFI are uniformly called "DPI technology".

The preceding DPI process is performed by a DPI server. FIG. 1 is an architecture diagram of a network where a DPI server is located in the prior art. As shown in FIG. 1, the DPI server is configured at the edge between the core network and the access network, for example, on an IP edge or a service router of the edge between the core network and the access network. The access network may include multiple access nodes (ANs), each of which may receive packets sent from a lot of user equipments (UEs) on a customer premises network (CPN). That is, all the packets from the access network are processed by the DPI server, so that the DPI server has to process a large quantity of packets. Therefore, the DPI server may fail to process the packets on a real-time basis. In addition, the DPI server should have powerful centralized processing capabilities.

SUMMARY

Embodiments of the present invention provide a method, system, and device for filtering packets to reduce the packet traffic processed by a DPI server.

A method for filtering packets is provided in an embodiment of the present invention, where a DPI proxy server is configured at an access-network user side on a distributed basis. The method includes:
  by the DPI proxy server, identifying the service type and/or contents of a received packet; and
  performing DPI filtering on the packet by using a preset DPI filtering policy according to the identified service type and/or contents.

A DPI proxy server is provided in an embodiment of the present invention, and is configured at an access-network user side on a distributed basis. The DPI proxy server includes:
  a receiving unit, adapted to receive a packet;
  a service identifying unit, adapted to: identify the packet received by the receiving unit, and identify the service type and/or contents of the packet in DPI mode;
  a policy storing unit, adapted to store a DPI filtering policy; and
  a DPI filtering unit, adapted to perform DPI filtering on the packet by using the DPI filtering policy stored in the policy storing unit, according to the service type and/or contents identified by the service identifying unit.

A system for filtering packets is provided in an embodiment of the present invention. The system includes a DPI proxy server configured at an access-network user side on a distributed basis, and an upstream device.

The upstream device is adapted to send a packet to the DPI proxy server.

The DPI proxy server is adapted to: identify the service type and/or contents of the packet in DPI mode, and perform DPI filtering on the packet by using a preset DPI filtering policy according to the identified service type and/or contents.

As seen from the preceding technical solution, with the method, system, and device provided in embodiments of the present invention, the DPI proxy server configured at the access-network user side identifies the service type and/or contents of the received packet, and performs DPI filtering on the packet by using the preset DPI filtering policy according to the identified service type and/or contents. In this technical solution, DPI proxy servers are configured at the access-network user side on a distributed basis; each DPI proxy server receives packets only from the UE on a CPN corresponding to the DPI proxy server. Compared with the DPI server uniformly configured at the edge between the core network and the access network in the prior art, the DPI proxy server provided in the embodiments of the present invention processes fewer packets, thus performing real-time DPI on the packets.

DETAILED DESCRIPTION OF THE INVENTION

To make the technical solution, objectives, and merits of the present invention clearer, the following describes the present invention in detail with reference to the accompanying drawings and exemplary embodiments.

The method provided in an embodiment of the present invention includes: by a DPI proxy server configured at the access-network user side, identifying the service type and/or contents of a received packet; and performing DPI filtering on the packet by using a preset DPI filtering policy according to the identified service type and/or contents.

The step of performing the DPI filtering on the packet includes: If the processing mode corresponding to the identified service type and/or contents in the DPI filtering policy is "pass allowed", sending the packet according to the destination address of the packet; if the processing mode corresponding to the identified service type and/or contents in the DPI filtering policy is "traffic limiting", limiting the traffic of the packet according to the DPI traffic limiting policy. The step of performing the DPI filtering on the packet may further include: If the processing mode corresponding to the identified service type and/or contents in the DPI filtering policy is "redirection", sending the packet to the DPI server for further DPI. The DPI filtering policy may be an access control list (ACL).

The preceding DPI proxy server may be configured in a residential gateway (RG), an access node (AN) or an aggregation node on a distributed basis. Only one DPI server may be configured at an IP edge, on a router, or on other uplink devices on the DPI proxy server.

Figure 1:
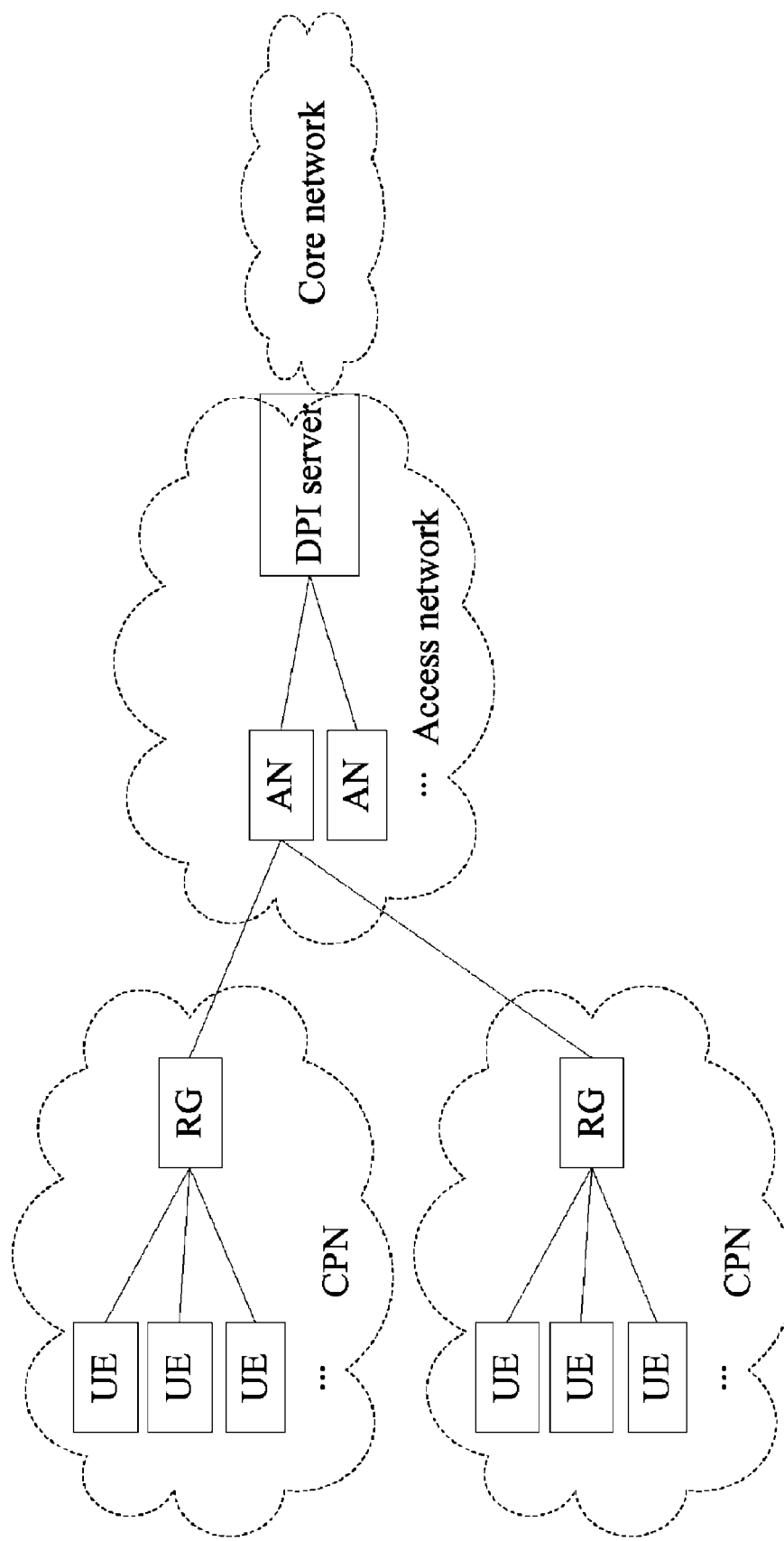
FIG. 1 is an architecture diagram of a network where a DPI server is located in the prior art.
Figure 2:
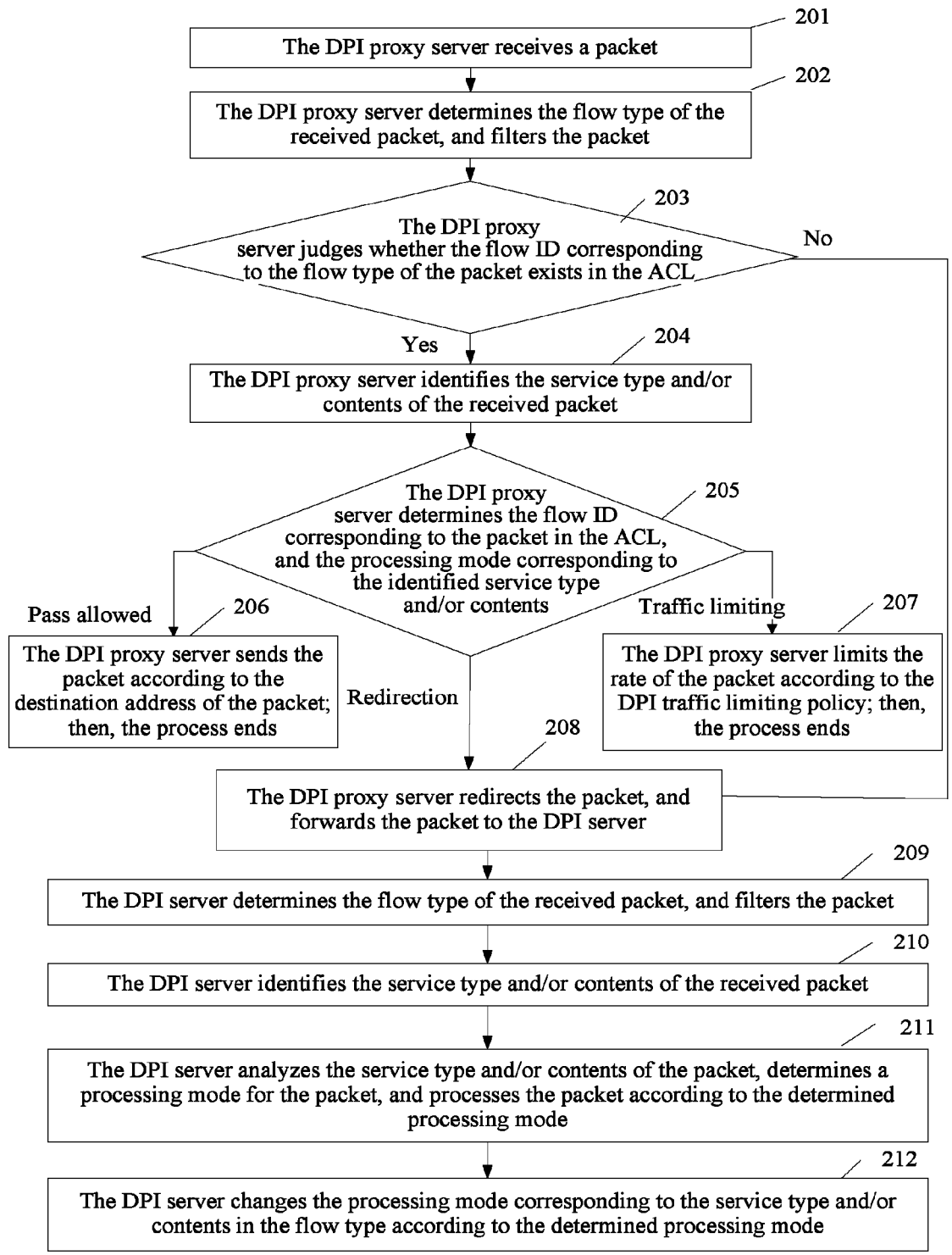
FIG. 2 is a flowchart of a method for filtering packets in an embodiment of the present invention.

FIG. 2 is a flowchart of a method for filtering packets in an embodiment of the present invention. The method includes the following steps:

Step 201: The DPI proxy server receives a packet.

Step 202: The DPI proxy server determines the flow type of the received packet, and filters the packet.

In this step, the DPI proxy server analyzes the contents of the packet below the application layer according to the 5-tuple of the received packet, classifies the packet, and determines the flow type of the packet. If the flow type of the packet is irrelevant to DPI, the DPI proxy server forwards the packet without processing the packet in DPI mode. If the flow type of the packet is relevant to DPI, the process proceeds to step 203.

Step 203: The DPI proxy server judges whether a flow ID corresponding to the flow type of the packet exists in the ACL. If the flow ID exists in the ACL, the process proceeds to step 204. If the flow ID does not exist in the ACL, the DPI proxy server processes the packet by default, for example, discards the packet, or the process goes to step 208.

In this step, the DPI proxy server may also judge whether the user ID included in the packet exists in the ACL.

The ACL in this step may be directly preset by a policy server in the DPI proxy server, or be set by the policy server in the DPI server first and then set by the DPI server in the DPI proxy server.

Table 1 shows a structure of the ACL in this step. The ACL stores the relationships among flow IDs or user IDs, service types, contents, and processing modes.

TABLE 1

| Flow ID or User ID | Application Layer Service Type | Content | Processing Mode |
|---|---|---|---|
| Flow ID 1 | Online game | — | >Allowed |
|  | P2P video service | News channel | >Redirection |
|  | Virus | Virus feature word | >Flow limiting |
|  | ... | ... |  |
| Flow ID 2 | All | — | >Allowed |
| Flow ID 3 | VoIP | — | >Redirection |
| Flow ID 4 | ... | ... |  |

In addition, step 204 may be executed directly, not following step 202 or step 203.

Step 204: The DPI proxy server identifies the service type and/or contents of the received packet.

In this step, the DPI proxy server may identify the received packet by analyzing the application layer of the packet, using the DFI method or other identification methods. These identification methods are available in the prior art, and are not further described.

In addition, before step 204, the DPI proxy server may also judge whether the flow ID corresponding to the flow type has the corresponding service type and contents in the ACL in step 202. That is, it may judge whether the service type and contents corresponding to the flow ID are not blank. If no corresponding service type and contents are available in the ACL, the DPI proxy server processes the packet according to the processing mode corresponding to the flow ID in the ACL. If there are available corresponding service type and contents in the ACL, the process goes to step 204.

Step 205: The DPI proxy server judges the flow ID corresponding to the packet and the processing mode corresponding to the identified service type and/or contents in the ACL. If the processing mode is "pass allowed", the process proceeds to step 206; if the processing mode is "traffic limiting", the process goes to step 207; if the processing mode is "redirection", the process goes to step 208.

In this step, if the processing mode is "redirection", the security or charge information of the packet may not be determined during the initial inspection, and needs to be further determined.

In addition, the packet may be categorized into white packet, black packet, and gray packet according to different processing modes. The white packet is allowed to pass; the black packet needs to undergo the traffic limiting; and the gray packet needs to be redirected for further inspection.

Step 206: The DPI proxy server sends the packet according to the destination address of the packet. Then, the process ends.

Step 207: The DPI proxy server limits the traffic of the packet according to the DPI traffic limiting policy. Then, the process ends.

In this step, the DPI traffic limiting policy may be a relationship between the service type and/or contents of the packet and the "traffic limiting" mode. Through the "traffic limiting" mode, the packet may be discarded or allowed to pass at certain traffic.

Step 208: The DPI proxy server redirects the packet, and forwards the packet to the DPI server.

In this step, the DPI proxy server may set the beginning point and the end point of a tunnel to be respectively the DPI proxy server and the DPI server by using the tunneling technology, where the tunnel may be an Ethernet tunnel, an IP tunnel or other special channels; or the DPI proxy server changes the destination address of the packet to the address of the DPI server, and forwards the packet to the DPI server.

Step 209: The DPI server determines the flow type of the received packet, and filters the packet.

The processing mode in this step is the same as the processing mode in step 202, and thus is not further described. In addition, the process may go to step 210 directly, not following step 209.

Step 210: The DPI server identifies the service type and/or contents of the received packet.

Step 211: The DPI server analyzes the service type and/or contents of the packet, determines a processing mode corresponding to the packet, and processes the packet according to the determined processing mode.

For example, after the DPI server analyzes the packet, the DPI server determines a "traffic limiting" mode for processing the packet if determining the service type and/or finding insecure elements in the contents; that is, the DPI server discards the packet or allows the packet to pass at certain traffic. If the DPI server does not find insecure elements, the DPI server may determine a "pass allowed" mode for processing the packet.

The method may further include the following steps:

Step 212: The DPI server sends a policy update request to the policy server.

In this step, the DPI server may directly change the DPI filtering policy in the DPI proxy server, send a policy update request to the policy server, and obtain a new DFI filtering policy from the policy server; or the DPI server may send a policy update request to the policy server and obtain a new DFI filtering policy from the policy server, and then the policy server changes the DPI filtering policy in the DPI proxy server.

In the process shown in FIG. 2, only the "pass allowed" and "traffic limiting" processing modes may be set in the ACL. In this case, the DPI server does not need to be configured, and the DPI proxy server needs to execute only step 201 to step 207 to complete the packet filtering process.

Figure 3:
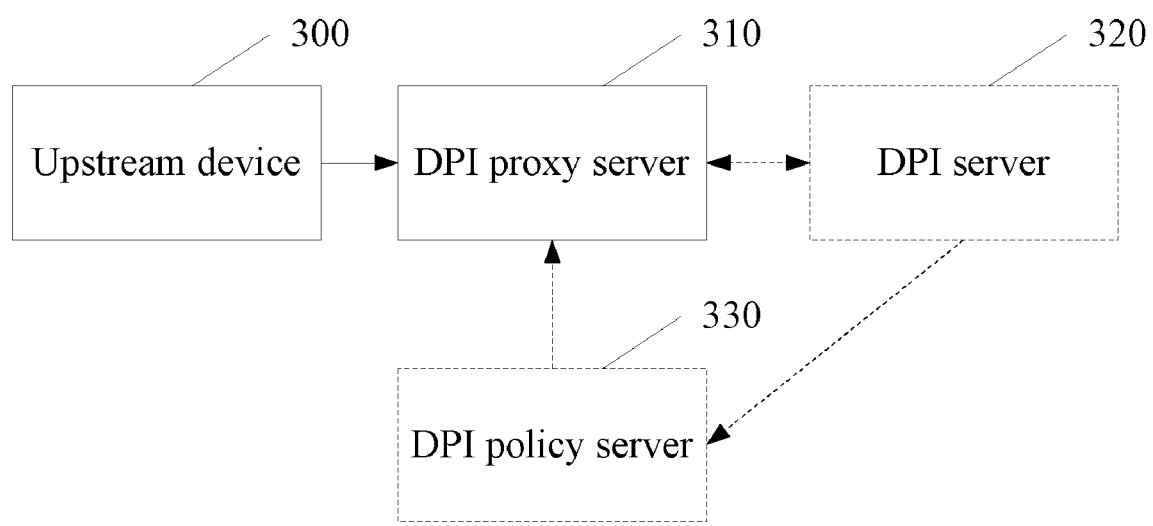
FIG. 3 shows a structure of a system in an embodiment of the present invention.

FIG. 3 shows a structure of a system in an embodiment of the present invention. As shown in FIG. 3, the system includes a DPI proxy server 310 configured at the access-network user side and an upstream device 300.

The DPI proxy server 310 is adapted to: identify the service type and/or contents of a received packet, and perform DPI filtering on the packet by using the preset DPI filtering policy according to the identified service type and/or contents.

The upstream device 300 is adapted to send packets to the DPI proxy server 310.

The system may further include a DPI server 320, which is adapted to: receive a packet forwarded from the DPI proxy server 310, identify the service type and/or contents of the received packet, analyze the identified service type and/or contents, determine a processing mode corresponding to the packet, and process the packet according to the determined processing mode.

The DPI proxy server 310 is further adapted to forward packets that need to be redirected during the DPI filtering process to the DPI server 320.

The DPI proxy server 310 performs the filtering process as follows: If the processing mode corresponding to the identified service type and/or contents in the DPI filtering policy is "pass allowed", sending the packet to the destination address of the packet; if the processing mode corresponding to the identified service type and/or contents in the DPI filtering policy is "traffic limiting", limiting the traffic of the packet by using the preset DPI traffic limiting policy; if the processing mode corresponding to the identified service type and/or contents in the DPI filtering policy is "redirection", forwarding the packet to the DPI server for DPI.

The system may further include a policy server 330, which is adapted to configure a DPI filtering policy for the DPI proxy server 310.

The DPI server 320 is further adapted to: send a policy update request that includes change information to the policy server 330, according to the packet processing mode determined by the DPI server 320, and change the DPI filtering policy set in the DPI proxy server 310.

The policy server 330 is adapted to: receive an update request from the DPI server 320, and update the DPI filtering policy stored in the policy server 330 according to the change information included in the update request.

The system may use the following method to change the policy server:

The DPI server 320 is further adapted to send a policy update request that includes change information to the policy server 330, according to the packet processing mode determined by the DIP server 320.

The policy server 330 is adapted to: receive the update request from the DPI server 320, update the DPI filtering policy stored in the policy server 330 according to the change information included in the update request, and change the DPI filtering policy in the DPI proxy server 310.

The DPI proxy server 310 may be configured in the RG, the AN, or the aggregation node. The DPI server 320 may be configured at the IP edge, the service server or a downstream aggregation node on the DPI proxy server 310.

For a radio network, the IP edge may be a gateway GPRS support node (GGSN) or an ASN GW, and the AN may be a base station (BS). For a digital subscriber line (DSL) network, the IP edge may be a broadband remote access server (BRAS)/broadband network gateway (BNG), and the AN may be a digital subscriber ling access multiplexer (DSLAM). For a passive optical network (PON), the AN may be an optical network terminal (ONT)/optical network unit (ONU) or an optical line termination (OLT).

Figure 4:
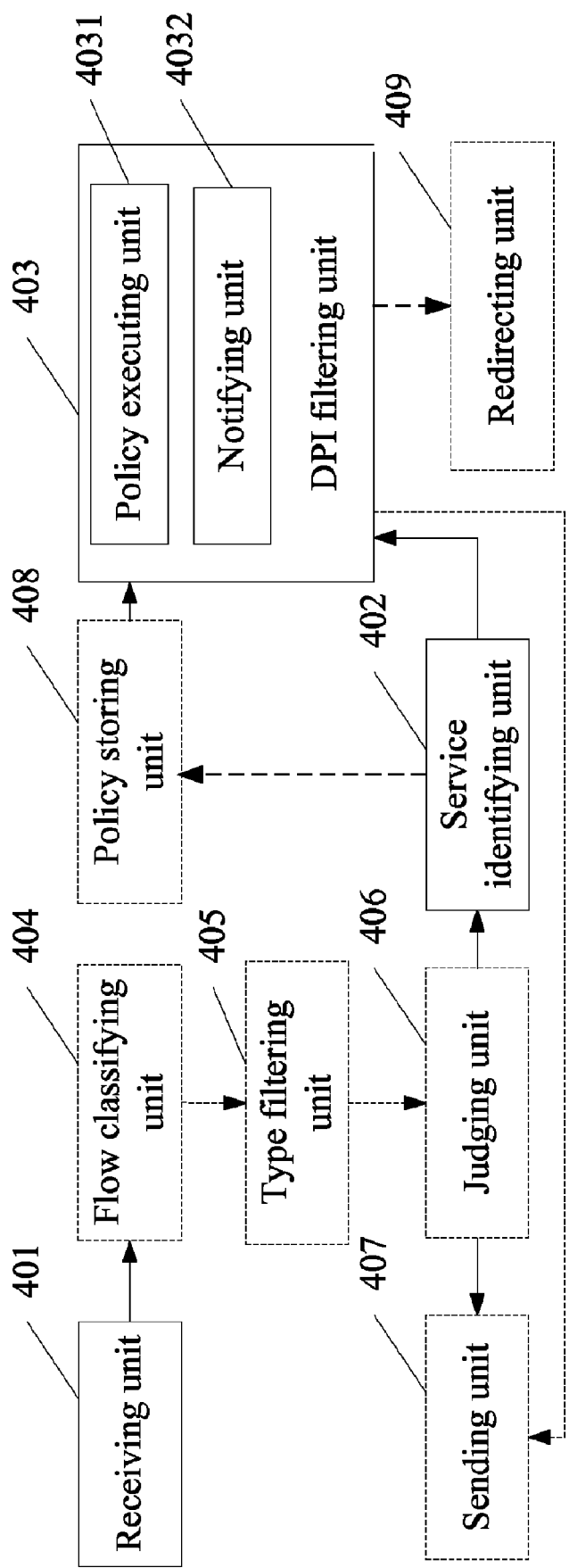
FIG. 4 shows a structure of a DPI proxy server in an embodiment of the present invention.

FIG. 4 shows a structure of a DPI proxy server in an embodiment of the present invention. As shown in FIG. 4, the DPI proxy server may include a receiving unit 401, a service identifying unit 402, and a DPI filtering unit 403.

The receiving unit 401 is adapted to receive a packet.

The service identifying unit 402 is adapted to identify the service type and/or contents of the packet received by the receiving unit 401.

The DPI filtering unit 403 is adapted to perform DPI filtering on the packet by using the preset DPI filtering policy according to the service type and/or contents identified by the service identifying unit 402.

The DPI proxy server may further include a flow classifying unit 404 and a type filtering unit 405. The flow classifying unit 404 is adapted to determine the flow type of the packet received by the receiving unit 401.

The type filtering unit 405 is adapted to: forward the packet corresponding to the flow type irrelevant to DPI to the device corresponding to the destination address of the packet according to the flow type determined by the flow classifying unit 404 or limit the traffic of the packet, and send the packet corresponding to the flow type related to DPI to the service identifying unit 402 for identification. The traffic limiting process includes discarding the packet.

The DPI proxy server may further include a judging unit 406 and a sending unit 407.

The judging unit 406 is adapted to: judge the packet that the type filtering unit 405 sends to the service identifying unit 402, and judge whether the flow ID corresponding to the flow type of the packet is set in the DPI filtering policy. If the flow ID is set in the DPI filtering policy, trigger the service identifying unit 402 to perform the identification. If the flow ID is not set in the DPI filtering policy, forbid the service identifying unit 402 to perform the identification, and provide the packet to the sending unit 407.

The sending unit 407 is adapted to: send the packet provided by the judging unit 406 to the device corresponding to the destination address of the packet, or forward the packet to the DPI server for DPI.

The sending unit 407 is further adapted to send the packet according to the destination address of the packet.

The DPI filtering unit 403 may include:

a policy executing unit 4031, adapted to determine a processing mode corresponding to the service type and/or contents in the DPI filtering policy according to the service type and/or contents identified by the service identifying unit 402; and a notifying unit 4032, adapted to: when the processing mode determined by the policy executing unit 4031 is "pass allowed", notify the sending unit 407 of sending the packet according to the destination address of the packet; when the processing mode determined by the policy executing unit 4031 is "traffic limiting", notify the sending unit 407 of sending the packet according to the preset DPI traffic limiting policy; when the processing mode determined by the policy executing unit 4031 is "redirection", notify the redirecting unit 4033 of redirecting the packet.

In this case, the DPI proxy server may further include a redirecting unit 409, which is adapted to send the received packet to the DPI server by using the tunneling technology or changing the destination address of the packet to the address of the DPI server.

The DPI proxy server may further include a DPI policy storing unit 408, which is adapted to store the DPI filtering policy. In addition, the DPI policy storing unit 408 may store other DPI-related policies, such as DPI service identification rules, DPI filtering policies and/or DPI traffic limiting policies.

Figure 5:
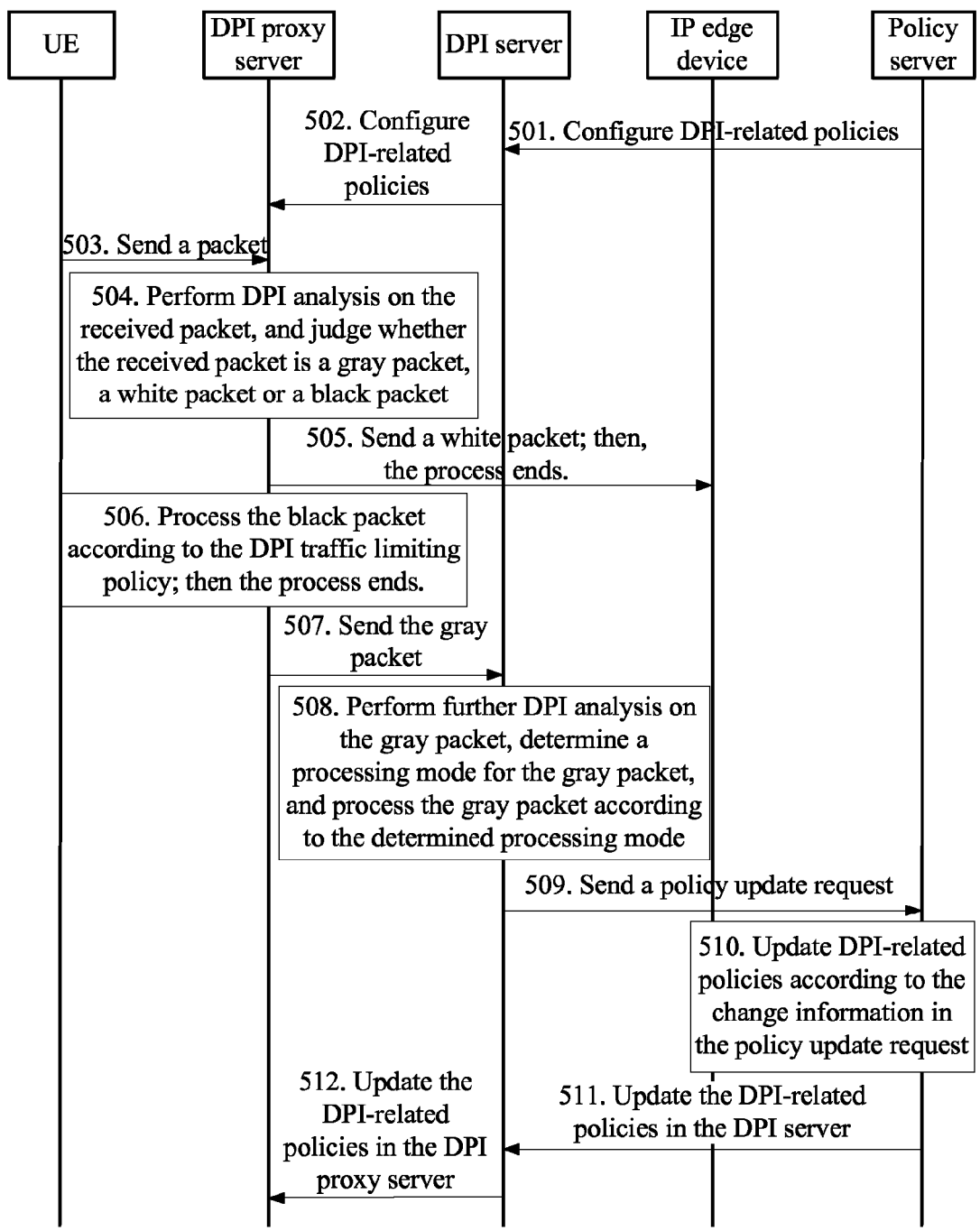
FIG. 5 is a systematic flowchart of a method for filtering packets in an embodiment of the present invention.
Figure 6:
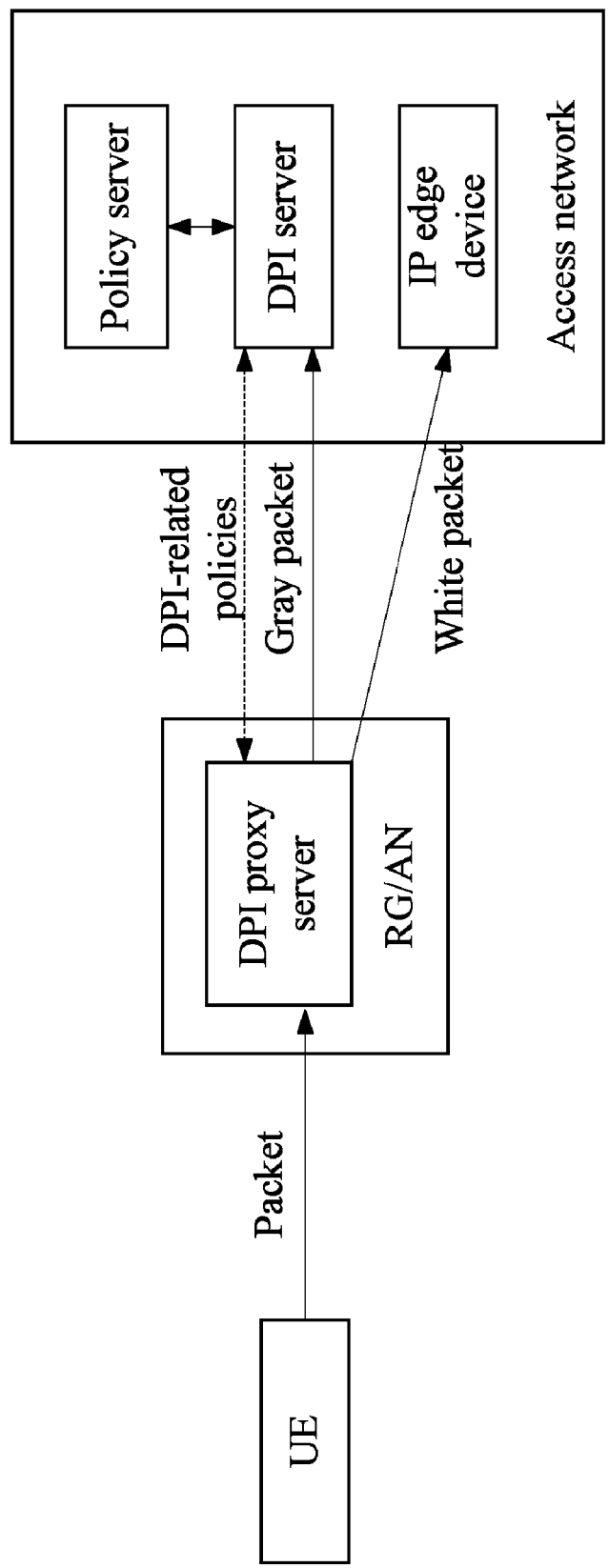
FIG. 6 is a schematic diagram illustrating a system for filtering packets in an embodiment of the present invention.

The following describes a process of applying the system provided in an embodiment of the present invention. FIG. 5 is a systematic flowchart of a method for filtering packets in an embodiment of the present invention. In this embodiment, the architecture of the system for filtering packets is shown in FIG. 6, and the DPI proxy server is configured in the AN, the RG, or the aggregation node. As shown in FIG. 5, the systematic flowchart includes the following steps:

Step 501: The policy server configures DPI-related policies for the DPI server.

The DPI-related policies may include DPI filtering policies, DPI traffic limiting policies or DPI service identification rules.

Before this step, if the DPI proxy server is configured in the RG, network authentication needs to be performed on the RG to ensure that the RG is a trusted node.

Step 502: The DPI server configures DPI-related policies for the DPI proxy server.

When the DPI proxy server is located in the DSLAM or the OLT, the DPI ACL and the DPI-related policies may be configured via a layer 2 control protocol (L2CP). When the DPI proxy server is located in the ONU/OLT, the DPI ACL and the DPI-related policies may be configured through the ONT management control interface (OMCI). When the DPI proxy server is located in the RG, the DPI ACL and the DPI-related policies may be configured through TR069.

Step 503: The DPI proxy server receives a packet from the UE.

Step 504: The DPI proxy server executes step 202 to step 205 in the process shown in FIG. 2. That is, the DPI proxy server performs DPI analysis on the received packet, and judges whether the received packet is a gray packet, a white packet or a black packet. If the received packet is a white packet, the process proceeds to step 505; if the received packet is a black packet, the process goes to step 506; if the received packet is a gray packet, the process goes to step 507.

Step 505: The DPI proxy server sends the white packet to the IP edge device. Then, the process ends.

Step 506: The DPI proxy server processes the black packet by using the DPI traffic limiting policy. Then, the process ends.

Step 507: The DPI proxy server sends the gray packet to the DPI server.

Step 508: The DPI server executes step 209 to step 211 in the process shown in FIG. 2. That is, the DPI server performs DPI analysis on the gray packet, determines a processing mode for the gray packet, and processes the gray packet according to the determined processing mode.

Step 509: The DPI server sends a policy update request to the policy server according to the determined processing mode.

Step 510: After receiving the policy update request, the policy server updates the DPI-related policies according to the change information in the policy update request.

Step 511: The policy server updates the DPI-related policies in the DPI server.

Step 512: The DPI server updates the DPI-related policies in the DPI proxy server.

According to the preceding description, by using the method, system and device provided in embodiments of the present invention, the DPI proxy server configured at the access-network user side identifies the service type and/or contents of the received packet, and performs DPI filtering on the packet by using the preset DPI filtering policy according to the identified service type and/or contents. In this technical solution, DPI proxy servers are configured at the access-network user side on a distributed basis; each DPI proxy server receives packets only from the UE on a CPN corresponding to the DPI proxy server. Compared with the DPI server configured at the edge between the core network and the access network in the prior art, the DPI proxy server provided in embodiments of the present invention processes fewer packets, thus performing real-time DPI on the packets.

In addition, the distributed DPI proxy servers and the centralized DPI server may be combined into a new hybrid DPI network. Although each distributed DPI proxy server processes few packets, all of the distributed DPI proxy servers process most of packets that need to undergo DPI, with only a few packets being redirected to the DPI server. Thus, the processing cost of the DPI server is reduced, and the implementation is easier.

Further, when the DPI proxy server performs DPI filtering on the packet, the DPI proxy server forwards the packets that need to be redirected to the DPI server; the DPI server performs further DPI. In this way, the packets that cannot be identified by the DPI proxy server can be further inspected, ensuring the reliability of the DPI on the packets. In addition, the DPI proxy server forwards only the packets that need to be redirected to the DPI server, thus reducing the centralized processing capability of the DPI server, and ensuring that the DPI server can process the packets on a real-time basis.

Although the invention has been described through several exemplary embodiments, the invention is not limited to such embodiments. It is apparent that those skilled in the art can make various modifications and variations to the invention without departing from the scope of the invention. The invention is intended to cover the modifications and variations provided that they fall in the scope of protection defined by the following claims or their equivalents.

What is claimed is:

1. A method for filtering packets, wherein a deep packet inspection (DPI) proxy server is configured at an access-network user side on a distributed basis, comprising:
by the DPI proxy server,
identifying a service type and/or contents of a received packet;
determining a processing mode corresponding to the identified service type and/or contents according to a preset DPI filtering policy; and
performing DPI filtering on the packet according to the determined processing mode; wherein the step of performing DPI filtering on the packet comprises:
if the processing mode corresponding to the identified service type and/or contents in the DPI filtering policy is "redirection", forwarding the packet to a DPI server for DPI, wherein the DPI comprises:
by the DPI server,
identifying the service type and/or contents of the received packet; analyzing the identified service type and/or contents of the packet;
determining a processing mode corresponding to the packet; and
processing the packet according to the determined processing mode;
if the processing mode corresponding to the identified service type and/or contents in the DPI filtering policy is "pass allowed", sending the packet according to a destination address of the packet; and
if the processing mode corresponding to the identified service type and/or contents in the DPI filtering policy is "traffic limiting", limiting the traffic of the packet according to a preset DPI traffic limiting policy.

2. The method of claim 1, wherein the step of forwarding the packet to the DPI server comprises: setting a beginning point and an end point of a tunnel to be respectively the DPI proxy server and the DPI server by using a tunneling technology, and forwarding the packet to the DPI server through the tunnel; or changing the destination address of the packet to the address of the DPI server, and sending the packet to the DPI server.

3. The method of claim 1, further comprising: changing, by the DPI server, the preset DPI filtering policy, wherein: the changing comprises: by the DPI server, sending a policy update request to a policy server, obtaining an updated DPI filtering policy from the policy server, and updating the DPI filtering policy set in the DPI proxy server; or by the DPI server, sending a policy update request to the policy server, and obtaining an updated DPI filtering policy from the policy server; and updating, by the policy server, the DPI filtering policy in the DPI proxy server.

4. The method of claim 1, wherein before identifying the service type and/or contents of the received packet, the method further comprises: by the DPI proxy server, judging whether a flow ID corresponding to the flow type related to DPI is preset in the DPI filtering policy; and if the flow ID is preset in the DPI filtering policy, continuing the identification.

5. The method of claim 1, wherein the step of identifying the service type and/or contents of the received packet comprises: analyzing the received packet at the application layer, or performing deep flow inspection (DFI) on the received packet.

* * * * *